United States Patent
Kirshenboim

(10) Patent No.: US 12,204,598 B2
(45) Date of Patent: Jan. 21, 2025

(54) ACCOMMODATION SEARCH

(71) Applicant: CWT Global B.V., Amsterdam (NL)

(72) Inventor: Amir Kirshenboim, Tel Aviv (IL)

(73) Assignee: CWT Global B.V., Amsterdam (NL)

( * ) Notice: Subject to any disclaimer, the term of this patent is extended or adjusted under 35 U.S.C. 154(b) by 0 days.

(21) Appl. No.: 18/331,062

(22) Filed: Jun. 7, 2023

(65) Prior Publication Data
US 2023/0315794 A1    Oct. 5, 2023

Related U.S. Application Data

(63) Continuation of application No. 17/227,725, filed on Apr. 12, 2021, now Pat. No. 11,709,903, which is a
(Continued)

(51) Int. Cl.
*G06F 7/00*        (2006.01)
*G01C 21/34*     (2006.01)
(Continued)

(52) U.S. Cl.
CPC ....... *G06F 16/9535* (2019.01); *G01C 21/343* (2013.01); *G01C 21/3682* (2013.01);
(Continued)

(58) Field of Classification Search
CPC ............ G06F 16/9535; G06F 16/9537; G06F 16/24578; G06F 16/29; G06F 3/0482;
(Continued)

(56) References Cited

U.S. PATENT DOCUMENTS

| 6,321,158 B1 | 11/2001 | Delorme et al. |
| 8,306,921 B2 | 11/2012 | Kalik et al. |

(Continued)

FOREIGN PATENT DOCUMENTS

WO    WO2013089569 A1    6/2013

OTHER PUBLICATIONS

Mar. 30, 2018 USPTO Office Action (U.S. Appl. No. 15/188,768).
(Continued)

*Primary Examiner* — Isaac M Woo
(74) *Attorney, Agent, or Firm* — Forsgren Fisher; Daniel A. Tysver; James M. Urzedowski

(57) ABSTRACT

A method for assisting selection of an accommodation by an accommodation search system includes receiving user credentials from a user device; receiving trip parameters from the user device; determining a basic list of accommodations that correspond with the trip parameters; determining one or more factors that apply to each individual accommodation of the basic list of accommodations; applying a weight value to each of the one or more factors that apply to each individual accommodation of the basic list of accommodations; aggregating the weight values of the one or more factors that apply to each individual accommodation to determine an aggregate weighted score for each individual accommodation of the basic list of accommodations; sorting the basic list of accommodations into a sorted list of accommodations based on the aggregate weighted score for each individual accommodation; and providing the sorted list of accommodations to the user device for viewing by a user.

20 Claims, 10 Drawing Sheets

Related U.S. Application Data continuation of application No. 16/211,673, filed on Dec. 6, 2018, now Pat. No. 10,977,326, which is a continuation of application No. 15/188,768, filed on Jun. 21, 2016, now Pat. No. 10,162,901.

(60) Provisional application No. 62/183,071, filed on Jun. 22, 2015, provisional application No. 62/183,075, filed on Jun. 22, 2015.

(51) Int. Cl.

| | | |
|---|---|---|
| *G01C 21/36* | (2006.01) | |
| *G06F 3/0482* | (2013.01) | |
| *G06F 16/2457* | (2019.01) | |
| *G06F 16/29* | (2019.01) | |
| *G06F 16/9535* | (2019.01) | |
| *G06F 16/9537* | (2019.01) | |
| *G06Q 30/0601* | (2023.01) | |
| *G06Q 50/00* | (2012.01) | |
| *G06Q 50/12* | (2012.01) | |
| *G06Q 50/14* | (2012.01) | |

(52) U.S. Cl.
CPC ...... *G06F 3/0482* (2013.01); *G06F 16/24578* (2019.01); *G06F 16/29* (2019.01); *G06F 16/9537* (2019.01); *G06Q 30/0625* (2013.01); *G06Q 50/01* (2013.01); *G06Q 50/12* (2013.01); *G06Q 50/14* (2013.01)

(58) Field of Classification Search
CPC .............. G01C 21/343; G01C 21/3682; G06Q 30/0625; G06Q 50/01; G06Q 50/12; G06Q 50/14
USPC .................................................. 707/600–899
See application file for complete search history.

(56) References Cited

U.S. PATENT DOCUMENTS

| | | |
|---|---|---|
| 8,364,689 B2 | 1/2013 | Hao |
| 9,767,183 B2 | 9/2017 | Su et al. |
| 2006/0106655 A1* | 5/2006 | Lettovsky ............ G06Q 10/025 705/6 |
| 2006/0287810 A1* | 12/2006 | Sadri ...................... G01C 21/20 701/438 |
| 2012/0221363 A1 | 8/2012 | Slowe |
| 2012/0221595 A1 | 8/2012 | Slowe |
| 2013/0339891 A1 | 12/2013 | Blumenberg |
| 2014/0278053 A1 | 9/2014 | Wu et al. |
| 2014/0278591 A1 | 9/2014 | Blecharczyk |
| 2018/0032997 A1 | 2/2018 | Gordon et al. |

OTHER PUBLICATIONS

Jan. 22, 2019 USPTO Office Action (U.S. Appl. No. 15/188,765).
Oct. 14, 2020 USPTO Office Action (U.S. Appl. No. 16/211,673).
Nov. 21, 2022 USPTO Office Action (U.S. Appl. No. 17/227,725).

* cited by examiner

200

Table 1: Predefined factors

210

| Factor | Weight |
|---|---|
| 1. User Preferred Accommodation | 18 |
| 2. Agency Preferred Accommodation | 12 |
| 3. Previous User Stay | 10 |
| 4. Company Preferred Accommodation | 8 |
| 5. Trending | 7 |
| 6. Colleague Preferred | 6 |
| 7. Previous Colleague Stay | 6 |
| 8. Price | 4 |
| 9. Rating | 3 |

Table 2: Basic list of accommodations

212

| Accommodation | Factors | Weighted Score |
|---|---|---|
| A | 1,2,3,4,6,7,8,9 | 67 |
| B | 1,6,7,8,9 | 37 |
| C | 1,2,3,8,9 | 47 |
| D | 4,5,9 | 18 |
| E | 6,7,8 | 16 |
| F | 2 | 12 |
| G | 1,7 | 24 |

Table 3: Sorted list of accommodations

214

| Rank | Accommodation | Weighted Score |
|---|---|---|
| 1 | A | 67 |
| 2 | C | 47 |
| 3 | B | 37 |
| 4 | G | 24 |
| 5 | D | 18 |
| 6 | E | 16 |
| 7 | F | 12 |

FIG. 2B

ACCOMMODATION SEARCH

CROSS-REFERENCE TO RELATED PATENT APPLICATIONS

This application a continuation of U.S. patent application Ser. No. 17/227,725, filed on Apr. 12, 2021, which was a continuation of U.S. patent application Ser. No. 16/211,673 (the '673 application), filed on Dec. 6, 2018, which issued as U.S. Pat. No. 10,977,326 on Apr. 13, 2021. The '673 application was a continuation of U.S. patent application Ser. No. 15/188,768, filed on Jun. 21, 2016, which issued as U.S. Pat. No. 10,162,901 and which itself claimed the benefit of U.S. Provisional Patent Application Nos. 62/183,071, filed Jun. 22, 2015, and 62/183,075, filed Jun. 22, 2015. All of these applications are incorporated herein by reference in their entireties.

BACKGROUND

A user may search for an accommodation by providing parameters such as a location and a date range into a user interface of a search system. Typically, to further limit the search, the user is required to manually select various sorting features that are predefined within the search system and provided to the user for selection.

SUMMARY

One embodiment relates to a method for assisting selection of an accommodation by an accommodation search system. The method includes receiving, by a processing circuit of a remote server, user credentials from a user device; receiving, by the processing circuit of the remote server, trip parameters from the user device; determining, by the processing circuit of the remote server, a basic list of accommodations that correspond with the trip parameters; determining, by the processing circuit of the remote server, one or more factors that apply to each individual accommodation of the basic list of accommodations; applying, by the processing circuit of the remote server, a weight value to each of the one or more factors that apply to each individual accommodation of the basic list of accommodations; aggregating, by the processing circuit of the remote server, the weight values of the one or more factors that apply to each individual accommodation to determine an aggregate weighted score for each individual accommodation of the basic list of accommodations; sorting, by the processing circuit of the remote server, the basic list of accommodations into a sorted list of accommodations based on the aggregate weighted score for each individual accommodation; and providing, by the processing circuit of the remote server, the sorted list of accommodations to the user device for viewing by a user.

Another embodiment relates to a method for assisting selection of an accommodation by an accommodation search system. The method includes transmitting, by a processing circuit of a user device, account information to an accommodation search system; transmitting, by the processing circuit of the user device, trip parameters to the accommodation search system; receiving, by the processing circuit of the user device, a sorted list of accommodations from the accommodation search system; and displaying, by the processing circuit on a display of the user device, the sorted list of accommodations to a user of the user device. The sorted list of accommodations is determined based on the account information and the trip parameters. In one embodiment, the sorted list of accommodations is ordered based on aggregate weighted scores of each accommodation according to a weighted scoring system. The weighted scoring system is used to facilitate the determination of the aggregate weighted scores for each accommodation based on one or more factors.

Still another embodiment relates to an accommodation search system for assisting selection of an accommodation. The accommodation search system includes a remote server and a user device. The remote server is configured to determine a list of accommodations that satisfy trip parameters, determine an aggregate score for each accommodation of the list of accommodations, and sort the list of accommodations based on the aggregate score for each accommodation of the list of accommodations. The aggregate score is based on a plurality of factors where each factor indicates a weight value. The aggregate score for an individual accommodation is the sum of the weight values of the plurality of factors that apply to the individual accommodation. The user device is communicably coupled to the remote server and configured to provide user credentials to the remote server, provide the trip parameters to the remote server, and display the sorted list of accommodations to a user of the accommodation search system. In one embodiment, at least a portion of the plurality of factors are indicated by the user credentials.

Yet another embodiment relates to an accommodation search system for assisting selection of an accommodation. The accommodation search system includes a processing circuit. The processing circuit is configured to receive user credentials from a user device, receive trip parameters from the user device, determine a list of accommodations that satisfy the trip parameters, determine an aggregate score for each accommodation of the list of accommodations, sort the list of accommodations based on the aggregate score for each accommodation of the list of accommodations, and provide a command to the user device to display the sorted list of accommodations to a user. The aggregate score is based on a plurality of factors, each factor indicating a weight value. At least a portion of the plurality of factors are indicated by the user credentials. The aggregate score for an individual accommodation is the sum of the weight values of the plurality of factors that apply to the individual accommodation.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIG. 2B is a visual depiction of processes performed by the various modules of the remote server of FIG. 2A, according to an exemplary embodiment.

DETAILED DESCRIPTION

Following below are more detailed descriptions of various concepts related to, and implementations of, methods, apparatuses, and systems for accommodation searching and processing based on various defined factors. The various concepts introduced above and discussed in greater detail below may be implemented in any of numerous ways, as the described concepts are not limited to any particular manner of implementation. Examples of specific implementations and applications are provided primarily for illustrative purposes. It should also be understood that the terminology is for the purpose of description only and should not be regarded as limiting.

Figure 1:
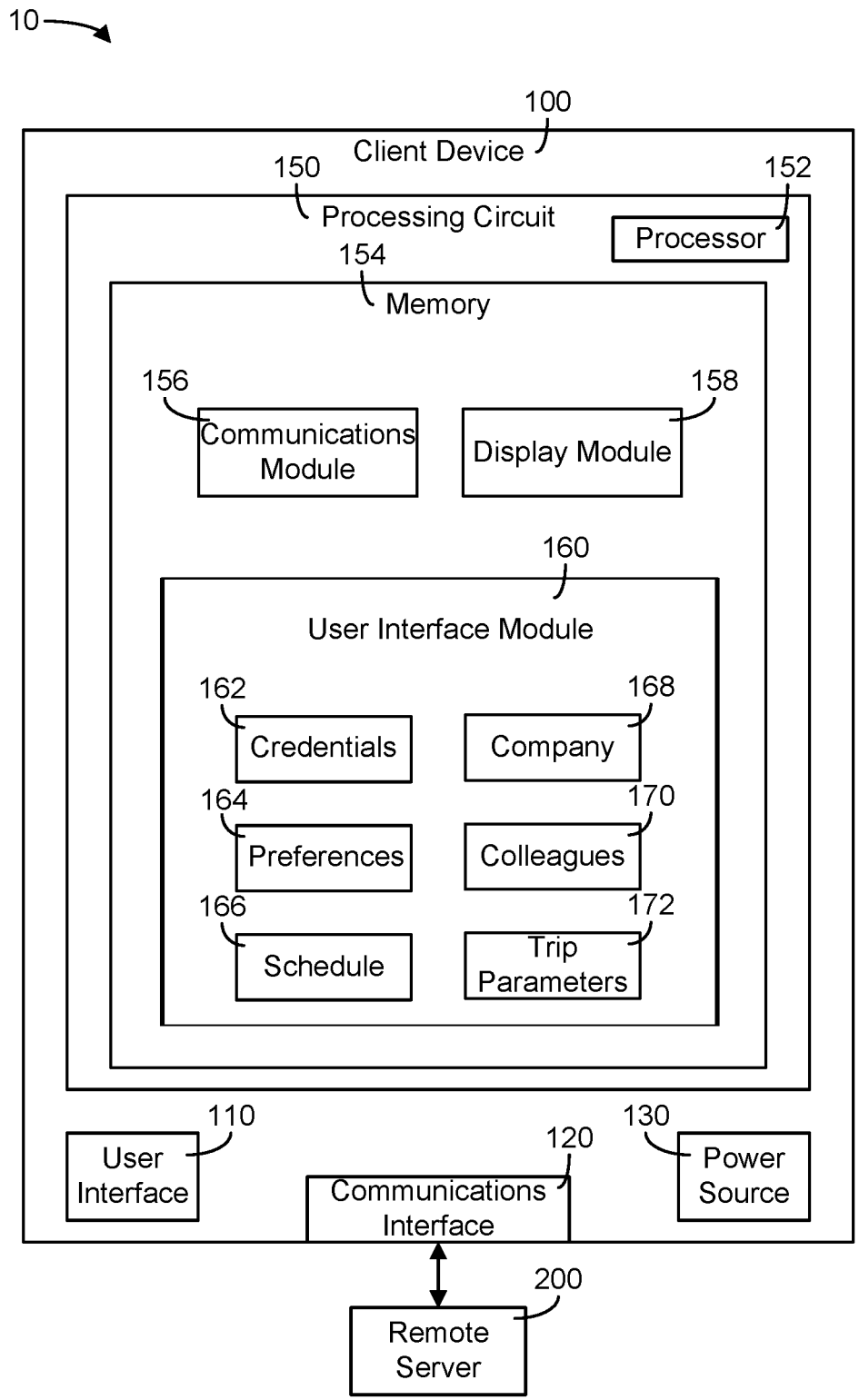
FIG. 1 is a schematic diagram of a client device, according to an exemplary embodiment.

Referring now to FIG. 1, FIG. 1 shows a schematic diagram of search system (e.g., a hotel search system, a hotel location selection system, etc.), shown as accommodation search system 10. The accommodation search system 10 is configured to provide a user with the ability to search for an accommodation based on a variety of information including, but not limited to, preferences, scheduling/calendar characteristics, trip characteristics/parameters, location characteristics, and the like. As shown in FIG. 1, the accommodation search system 10 includes a user device, shown as client device 100, and a remote server, shown as remote server 200. According to an exemplary embodiment, the client device 100 is configured to establish a connection between the client device 100 and the remote server 200 and provide the variety of information to the remote server 200. The client device 100 may provide the variety of information at least one of automatically and manually responsive to a user input. In one embodiment, the client device 100 is structured as a portable device. The portable device may include, but is not limited to, a smartphone, a tablet, a laptop, a smart watch, and/or any other type of form factor device. In an alternative embodiment, the client device 100 is structured as a stationary device (e.g., a desktop computer, etc.).

As shown in FIG. 1, the client device 100 includes a user interface 110, a communication interface 120, a power source 130, and a processing circuit 150. The user interface 110 may include a display screen, a touch screen, one or more buttons, a touch pad, a mouse, and/or other devices to allow a user to operate the client device 100. According to an exemplary embodiment, the user interface 110 is configured to provide a display to the user of the client device 100. In one embodiment, the display of the user interface 110 provides an account login interface. The account login interface may be configured to provide a user of the accommodation search system 10 with the ability to sign-up for an account associated with the accommodation search system 10 (e.g., a new user, etc.), access an existing account associated with the accommodation search system 10 (e.g., with user credentials such as a username, email, password, etc.), and/or delete an existing account associated with the accommodation search system 10. In another embodiment, the display of the user interface 110 provides a client account interface. The client account interface may be configured to provide a user of the accommodation search system 10 with the ability to update/change credentials, add/remove preferences, sync or enter itinerary/calendar information, view search/booking history, enter or link colleague information, and enter or link company information, among other possibilities. In still another embodiment, the display of the user interface 110 provides an accommodation search interface. The accommodation search interface may be configured to provide a user of the accommodation search system 10 with the ability to enter specific characteristics for a trip/event (e.g., location, date range, number of people, etc.) to begin a search for an accommodation (e.g., a hotel reservation, a car rental, an airline reservation, etc.). In some embodiments, the display of the user interface 110 provides search results in the form of a list results interface. According to an exemplary embodiment, the list results interface provides search results that are sorted and presented in a list to the user based on a weighted scoring system. The weighted scoring system may take into account a variety of factors including, but not limited to, client preferences, company preferences, agency preferences, colleague preferences, client history, colleague history, current/future trends, location information, and the like. In other embodiments, the display of the user interface 110 provides search results in the form of a map results interface. According to an exemplary embodiment, the map results interface provides the search results on a map which are numbered based on the weighted scoring system and presented based on location (e.g., relative to a current location, relative to a location of interest, etc.).

Referring still to FIG. 1, the communication interface 120 may be configured to facilitate the communication between the client device 100 and the remote server 200. The communication may be via any number of wired or wireless connections. For example, a wired connection may include a serial cable, a fiber optic cable, a CAT5 cable, or any other form of wired connection. In comparison, a wireless connection may include the Internet, Wi-Fi, cellular, radio, Bluetooth, etc. In one embodiment, a controller area network (CAN) bus provides the exchange of signals, information, and/or data. The CAN bus includes any number of wired and wireless connections. The power source 130 is configured to power the client device 100. In one embodiment, the power source 130 is an internal power source, such as a battery. In some embodiments, the battery is rechargeable. In other embodiments, the power source 130 is an external power source (e.g., provided through a cable connecting to mains power, a wall outlet, etc.).

As shown in FIG. 1, the processing circuit 150 includes a processor 152 and a memory 154. The processor 152 may be implemented as a general-purpose processor, an application specific integrated circuit (ASIC), one or more field programmable gate arrays (FPGAs), a digital signal processor (DSP), a group of processing components, or other suitable electronic processing components. One or more memory devices 154 (e.g., RAM, ROM, Flash Memory, hard disk storage, etc.) may store data and/or computer code for facilitating the various processes described herein. Thus, the one or more memory devices 154 may be communicably connected to the processor 152 and provide computer code or instructions to the processor 152 for executing the processes described in regard to the client device 100 herein. Moreover, the one or more memory devices 154 may be or include tangible, non-transient volatile memory or non-volatile memory. In some embodiments, the one or more memory devices 154 may include database components, object code components, script components, or any other type of information structure for supporting the various activities and information structures described herein.

The memory 154 is shown to include various modules for completing processes described herein. More particularly, the memory 154 includes modules configured to provide a variety of information (e.g., trip parameters, preferences, credentials, itinerary/calendar information, etc.) to the remote server 200 such that the remote server 200 may provide accommodation search results (e.g., based on a weighted scoring system, etc.) to a user of the client device 100. The modules may also be configured to provide distance and/or navigation instructions between an accommodation of the search results and a location of interest. While various modules with particular functionality are shown in FIG. 1, it will be understood that the client device 100 and the memory 154 may include any number of modules for completing the functions described herein. For example, the activities of multiple modules may be combined as a single module and additional modules with additional functionality may be included. Further, it will be understood that the processing circuit 150 of the client device 100 may further control other processes beyond the scope of the present disclosure.

As shown in FIG. 1, the client device 100 includes a communication module 156, a display module 158, and a user interface module 160. The communication module 156 may be communicably coupled to the communication interface 120 and configured to control the communication (e.g., the transfer of information, etc.) between the client device 100 and the remote server 200. The display module 158 is configured to provide a display on the user interface 110 (e.g., a monitor, a touchscreen, a display screen, etc.) of the client device 100. The display module 158 is further configured to provide the display regarding various user interfaces (e.g., an account login interface, a client account interface, an accommodation search interface, a list results interface, a map results interface, etc.) corresponding with the accommodation search system 10. The display module 158 may also be configured to display various other features and/or user interfaces not related to the present disclosure.

The user interface module 160 may be configured to receive an input from a user of the client device 100 via the user interface 110 (e.g., touchscreen inputs, button inputs, etc.). The input may include a command to operate the client device 100 (e.g., turn on, turn off, select a feature, etc.). The input may also include a command to open an application interface (e.g., a smartphone application, a tablet application, etc.) or website interface (e.g., a website, URL, etc.) associated with the accommodation search system 10. The user interface module 160 may further be configured to instruct the display module 158 which user interface to display to the user of the client device 100 based on the inputs. For example, a user may select to open an application associated with the accommodation search system 10. Therefore, the user interface module 160 may provide instructions to the display module 158 to display of an account login interface on a display of the user interface 110 such that the user may provide user credentials 162 to log into the accommodation search system 10 via the client device 100. The user credentials 162 may include a username, an email, and/or a password, among other possibilities. The user credentials 162 may additionally or alternatively include a social media or business networking account of a user of the client device 100. The user credentials 162 may be stored within the memory 154 of the client device 100 such that the user stays logged into his/her account on the respective client device 100.

In one embodiment, the user logging into the accommodation search system 10 may be a new user. Therefore, following creating a new account, the user may be provided a client account interface by the display module 158 on the display of the user interface 110 of the client device 100. The client account interface may be configured to facilitate a new user in entering or a returning user in updating his/her user credentials 162, user preferences 164, schedule 166, company information 168, and/or colleague information 170. The aforementioned information may be stored in the memory 154 of the client device 100 and retrieved by the remote server 200 when needed, or transmitted from the client device 100 and stored directly on the remote server 200. In an alternative embodiment, a new user may choose to skip creating a new account and continue as a guest user. As a guest user, the user may be able to enter at least a portion of the aforementioned information when conducting an accommodation search directly.

The user preferences 164 may include a price range (e.g., a maximum price of the accommodation, a minimum price of the accommodation, etc.), a minimum accommodation rating (e.g., based on user ratings, user reviews, agency ratings, etc.), a preferred accommodation or a group/chain of accommodations (e.g., hotel A, hotel chain B, etc.), a distance from a location of interest (e.g., a meeting, an office, a city center, etc.), and the like. The schedule 166 may be directly entered by the user of the client device 100 or automatically synced from a calendar/itinerary on the client device 100. The schedule 166 may include a time/date of an event (e.g., a meeting, a dinner, a sporting event, etc.) and/or a location of an event or point of interest (e.g., a city center, a meeting address, an office address, a landmark, a museum, a sporting event, a restaurant address/name, etc.). The company information 168 may include information regarding a company the user of the accommodation search system 10 may be employed by, a company the user of the accommodation search system 10 may have a meeting with, or a company a guest of the user of the accommodation search system 10 may be employed by, among other alternatives. In one embodiment, the user enters the company information 168 manually. In another embodiment, the accommodation search system 10 may access the company information 168 from social media and/or business networking accounts (e.g., LinkedIn®, Facebook®, Twitter®, etc.) of the user (e.g., if given access by the user, etc.). The colleague information 170 may include information about friends, coworkers, family members, and the like. In one embodiment, the user enters the colleague information 170 manually. In another embodiment, the accommodation search system 10 may access the colleague information 170 from social media and/or business networking accounts of the user. The remote server 200 may receive and use the user credentials 162, the user preferences 164, the schedule 166, the company information 168, and/or the colleague information 170 when applying the weighted scoring system to a user's accommodation search, as is described more fully herein.

A user of the accommodation search system 10 may be further provided an accommodation search interface by the display module 158 responsive to the user interface module 160 receiving a search request from a user of the client device 100. The accommodation search interface may be configured to allow a user of the accommodation search system 10 to enter trip parameters 172 regarding a trip (e.g., vacation, business trip, etc.) the user may be taking or planning. The trip parameters 172 may include a location/destination for the trip (e.g., a city, a zip code, a current location, etc.), a date range for the trip (e.g., a beginning date, a check in data, an end date, a check out date, etc.), a number of guests (e.g., one, two, four, etc.), a number of rooms or tickets needed, a time of departure, a time of arrival, and the like. The remote server 200 may receive and use the trip parameters 172 to find accommodations (e.g., hotels, flights, car rentals, etc.) that correspond with the trip parameters 172 and at least some of the user preferences 164, the schedule 166, the company information 168, and the colleague information 170.

The display module 158 may also be configured to receive a command from the remote server 200 to display certain user interfaces to a user of the accommodation search system 10. For example, the remote server 200 may send data to the display module 158 regarding search results that are based on the information 162-172 provided by the user. The display module 158 may be configured to provide the accommodation search results in a list configuration via a list results interface and/or a map configuration via a map results interface.

Figure 2A:
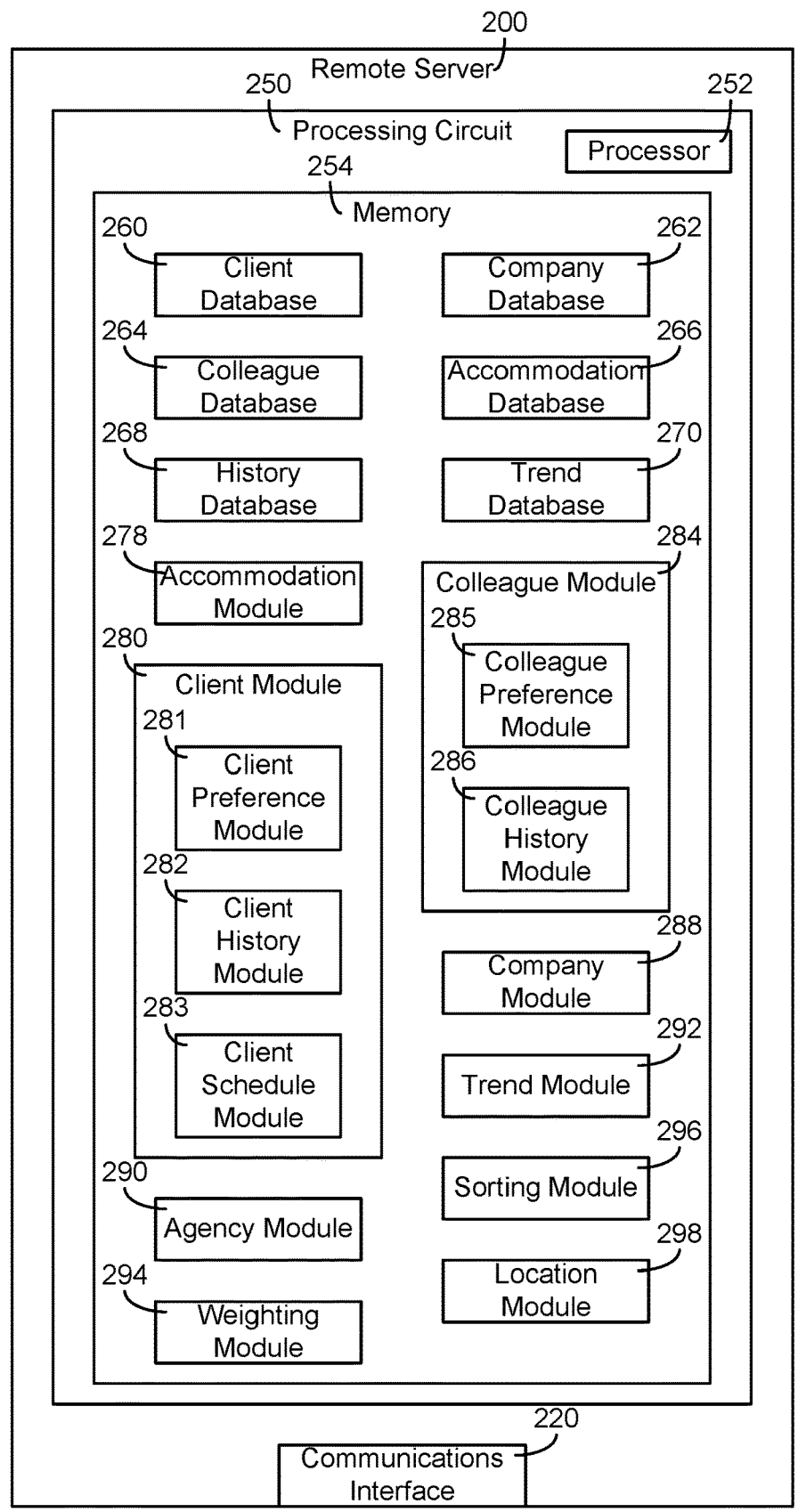
FIG. 2A is a schematic diagram of a remote server, according to an exemplary embodiment.

Referring now to FIG. 2A, FIG. 2A shows a schematic diagram of the remote server 200. As shown in FIG. 2A, the remote server 200 includes a communication interface 220 and a processing circuit 250. The communication interface 220 may be configured to facilitate the communication between one or more client device(s) 100 and the remote server 200. The communication between the components of the remote server 200, and the remote server 200 and the client device(s) 100 may be via any number of wired or wireless connections. For example, a wired connection may include a serial cable, a fiber optic cable, a CAT5 cable, or any other form of wired connection. In comparison, a wireless connection may include the Internet, Wi-Fi, cellular, radio, Bluetooth, etc. In one embodiment, a controller area network (CAN) bus provides the exchange of signals, information, and/or data. The CAN bus includes any number of wired and wireless connections.

As shown in FIG. 2A, the processing circuit 250 includes a processor 252 and a memory 254. The processor 252 may be implemented as a general-purpose processor, an application specific integrated circuit (ASIC), one or more field programmable gate arrays (FPGAs), a digital signal processor (DSP), a group of processing components, or other suitable electronic processing components. One or more memory devices 254 (e.g., RAM, ROM, Flash Memory, hard disk storage, etc.) may store data and/or computer code for facilitating the various processes described herein. Thus, the one or more memory devices 254 may be communicably connected to the processor 252 and provide computer code or instructions to the processor 252 for executing the processes described in regard to the remote server 200 herein. Moreover, the one or more memory devices 254 may be or include tangible, non-transient volatile memory or non-volatile memory. In some embodiments, the one or more memory devices 254 may include database components, object code components, script components, or any other type of information structure for supporting the various activities and information structures described herein.

The memory 254 is shown to include various databases and modules for completing processes described herein. More particularly, the memory 254 includes databases and modules configured to receive various information from one or more client devices 100 and provide accommodation search results (e.g., based on a weighted scoring system, etc.) to a user of the accommodation search system 10. While various databases and modules with particular functionality are shown in FIG. 2A, it will be understood that the remote server 200 and the memory 254 may include any number of databases and/or modules for completing the functions described herein. For example, the activities of multiple databases and/or modules may be combined as a single database and/or module and additional databases and/or modules with additional functionality may be included. Further, it will be understood that the processing circuit 250 of the remote server 200 may further control other processes beyond the scope of the present disclosure.

As shown in FIG. 2A, the remote server 200 includes a client database 260, a company database 262, a colleague database 264, an accommodation database 266, a history database 268, and a trend database 270. The remote server 200 further includes an accommodation module 278, a client module 280, a colleague module 284, a company module 288, an agency module 290, a trend module 292, a weighting module 294, a sorting module 296, and a location module 298.

The client database 260 is configured to store at least one of the user credentials 162, the user preferences 164, and the schedule 166 for each registered user of the accommodation search system 10 (e.g., a user with an account, etc.). The company database 262 is configured to store company preferences for a plurality of companies. For example, a company may make a company account within the accommodation search system 10 and specify certain information regarding accommodations that they prefer for their employees based on a price range, a minimum accommodation rating, a preferred accommodation or a group/chain of accommodations, and the like. The company database 262 may be linked to the client database 260 such that when a user specifies which company he/she is employed by, the remote server 200 is able to link the company preferences to the user credentials 162 of the respective user. The user may manually enter his/her company of employment or it may be retrieved automatically from a social media or business networking account of the user.

The colleague database 264 is configured to store preferences of colleagues (e.g., coworkers, friends, family, etc.) of a user of the accommodation search system 10. The colleague database 264 may be linked to the client database 260 such that the colleague database 264 may populate automatically based on colleague information 170 retrieved from social media accounts or other sources that may indicate colleagues of the user (e.g., a friend of a user on a social media platform may have his/her preferences shared with the user if both the friend and the user are registered on the accommodation search system 10, etc.). The colleague database 264 may also be linked to the company database 262 such that users of the accommodation search system 10 that are employed by the same company receive each other's preferences, which are then stored in the colleague database 264 (i.e., users that share the same employment may share preferences, etc.) and linked to the user credentials 162. The user may also manually populate the colleague database 264 by manually entering the colleague information 170. If the colleague is a registered user of the accommodation search system 10, their preferences may populate the colleague database 264 and link to the user credentials 162 of the user.

The accommodation database 266 is configured to store accommodation information regarding a plurality of accommodations (e.g., hotels, rental cars, plane tickets, etc.). The accommodation information may include pricing (e.g., $200/night, etc.), ratings (e.g., 4.5/5 stars, etc.), availability (e.g., vacancy, no vacancy, etc.), location information (e.g., address, etc.), accommodation company (e.g., hotel A, etc.), accommodation group/chain (e.g., hotel chain B, etc.), and the like about the plurality of accommodations. The history database 268 is configured to store information/data regarding an accommodation history of the plurality of users of the accommodation search system 10 and/or the users' colleague(s). The history may include accommodations in which a user and/or the user's colleague(s) previously used/stayed at (e.g., a hotel that the user has stayed at, a hotel a colleague of the user has stayed at, etc.). The user and/or colleague accommodation history may be linked the user credentials 162 of a user of the accommodation search system 10. Therefore, the user credentials 162 of a user of the accommodation search system 10 may indicate user preferences 164, schedule 166 of the user, company preferences, colleague preferences, user history, and/or colleague history, among other possibilities. The trend database 270 is configured to store trend information/data that may indicate various current and/or future trends for accommodations. For example, the trends may include accommodations that are currently popular with the general public and/or colleagues of a user of the accommodation search system 10.

Referring still to FIG. 2A, the accommodation module 278 may be communicably coupled to the accommodation database 266 and/or the user interface module 160. In one embodiment, the accommodation module 278 is configured to receive the trip parameters 172 from a user of the accommodation search system 10 via the client device 100. According to an exemplary embodiment, the trip parameters 172 facilitate the accommodation module 278 in retrieving (e.g., querying, extracting, etc.) a basic list of accommodations from the accommodation database 266 based on the trip parameters 172. For example, the basic list of accommodations may include a plurality of accommodations that satisfy the trip parameters 172, including aspects such as vacancy during a designated date range, located in a certain city, etc. The basic list of accommodations may then undergo various weighting and sorting processes, as is described more fully herein.

The client module 280 may be communicably the user interface module 160. In one embodiment, the client module 280 is configured to receive the user credentials 162, the user preferences 164, the schedule 166, the company information 168, and/or the colleague information 170 from a user of the accommodation search system 10 via the client device 100. In one embodiment, the client module 280 is communicably coupled to the client database 260 and configured to transmit (e.g., upload, etc.) at least one of the user credentials 162, the user preferences 164, and the schedule 166 to the client database 260. In some embodiments, the client module 280 is communicably coupled to the company database 262 and configured to transmit the company information 168 for a user of the accommodation search system 10 to the company database 262 (e.g., associated with the user credentials 162 of a user, etc.). In other embodiments, the client module 280 is communicably coupled to the colleague database 264 and configured to transmit the colleague information 170 for a user of the accommodation search system 10 to the colleague database 264 (e.g., associated with the user credentials 162 of a user, etc.). Additionally or alternatively, the company information 168 and/or the colleague information 170 may be uploaded to the company database 262 and/or the colleague database 264 automatically (e.g., if access to this information is allowed by a user of the accommodation search system 10, etc.) based on a user of the accommodation search system 10 linking his/her account to a social media account/profile (e.g., Facebook®, Twitter®, etc.), a business networking account/profile (e.g., LinkedIn®, etc.), and the like.

As shown in FIG. 2A, the client module 280 may include a client preference module 281, a client history module 282, and a client schedule module 283. The client preference module 281 may be configured to access the client database 260 responsive to a user logging into the accommodation search system 10 with his/her user credentials 162. The client preference module 281 may retrieve the user preferences 164 for the designated user credentials 162 (i.e., a user currently logged into the accommodation search system 10, etc.) from the client database 260. The weighting module 294 may determine an aggregate weighted score for each accommodation of the basic list of accommodations retrieved by the accommodation module 278 via a weighted scoring system based on the user preferences 164. The client history module 282 may be configured to access the history database 268 responsive to a user logging into the accommodation search system 10 with his/her user credentials 162. The client history module 282 may retrieve the user accommodation history for the designated user credentials 162 (e.g., previous hotels a user stayed at, if applicable, etc.) from the history database 268. The weighting module 294 may determine the aggregate weighted score for each accommodation of the basic list of accommodations retrieved by the accommodation module 278 via the weighted scoring system based further on the user accommodation history. The client schedule module 283 may be configured to access the client database 260 responsive to a user logging into the accommodation search system 10 with his/her user credentials 162. The client schedule module 283 may retrieve the schedule 166 for the designated user credentials 162 from the client database 260. The weighting module 294 may determine the aggregate weighted score for each accommodation of the basic list of accommodations retrieved by the accommodation module 278 via the weighted scoring system based further on the schedule 166. In an alternative embodiment, the client schedule module 283 is configured to interpret the schedule 166 of a user to determine locations of interest for use by the location module 298 to determine distances and/or routes from an accommodation to the location of interest, as is described more fully herein.

According to an exemplary embodiment, the colleague module 284 is communicably coupled to the client module 280 such that the colleague module 284 may receive the user credentials 162 from the client module 280 when a user accesses the accommodations search system 10. As shown in FIG. 2A, the colleague module 284 includes a colleague preference module 285 and a colleague history module 286. The colleague preference module 285 may be configured to access the colleague database 264 responsive to a user logging into the accommodation search system 10 with his/her user credentials 162. The colleague preference module 285 may retrieve the colleague preferences of a user of the accommodation search system 10 from the colleague database 264. The weighting module 294 may determine the aggregate weighted score for each accommodation of the basic list of accommodations retrieved by the accommodation module 278 via the weighted scoring system based further on the colleague preferences. The colleague history module 286 may be configured to access the history database 268 responsive to a user logging into the accommodation search system 10 with his/her user credentials 162. The colleague history module 286 may retrieve the colleague accommodation history for the designated user credentials 162 (e.g., previous hotels a colleague of a user stayed at, if applicable, etc.) from the history database 268. The weighting module 294 may determine the aggregate weighted score for each accommodation of the basic list of accommodations retrieved by the accommodation module 278 via the weighted scoring system based further on the colleague accommodation history.

According to an exemplary embodiment, the company module 288 is communicably coupled to the client module 280 such that the company module 288 may receive the user credentials 162 from the client module 280 when a user accesses the accommodations search system 10. The company module 288 may be configured to access the company database 262 responsive to a user logging into the accommodation search system 10 with his/her user credentials 162. The company module 288 may retrieve the company preferences of a company that a user is employed by from the company database 262. The weighting module 294 may determine the aggregate weighted score for each accommodation of the basic list of accommodations retrieved by the accommodation module 278 via the weighted scoring system based further on the company preferences.

According to an exemplary embodiment, the agency module 290 is configured to store agency preferences of an agency (e.g., Carlson Wagonlit Travel® (CWT), etc.) who owns, operates, designed, is affiliated with, etc. the accommodation search system 10. The agency preferences may include a preferred accommodation or group/chain of accommodations that the agency is affiliated with, owns, operates, and the like. The agency module 290 may be configured to provide the weighting module 294 with the agency preferences. The weighting module 294 may determine the aggregate weighted score for each accommodation of the basic list of accommodations retrieved by the accommodation module 278 via the weighted scoring system based further on the agency preferences.

The trend module 292 may be configured to access the trend database 270 to receive trend information indicating various current and/or future trends for accommodations. According to an exemplary embodiment, the trend module 292 is communicably coupled to the client module 280 such that the trend module 290 may receive the user credentials 162 from the client module 280 when a user accesses the accommodations search system 10. The trend module 292 may be configured to retrieve trend information for colleagues of a user based on the user credentials 162 received from the client module 280. The trend module 292 may also be configured to retrieve trend information for accommodations based on the trends within the general public (e.g., people not affiliated with the user, etc.). For example, the trend information may indicate an accommodation that is currently receiving good reviews and frequently being used (e.g., a certain percentage of rooms of a hotel are consistently occupied over a designated time period, etc.). The weighting module 294 may determine the aggregate weighted score for each accommodation of the basic list of accommodations retrieved by the accommodation module 278 via the weighted scoring system based further on the trend information.

The weighting module 294 is configured to determine the aggregate weighted score for each of the plurality of accommodations of the basic list of accommodations retrieved by the accommodation module 278 based on a plurality of factors. The plurality of factors may include, but are not limited to, at least one of the user preferences 164, the user accommodation history, the schedule 166, the colleague preferences, the colleague accommodation history, the company preferences, the agency preferences, and the trend information. The weighting module 294 may be configured to use the plurality of factors in the weighted scoring system to determine the aggregate weighted score for each accommodation within the basic list of accommodations. The weighted scoring system may be based on a function, algorithm, decision matrix, and/or any other type of weighting system. In one embodiment, the weights (e.g., predetermined values, etc.) for each factor are predefined and stored within the weighting module 294. The weighting module 294 may be further configured to apply the weights to a respective accommodation for each factor that may apply, and then aggregate the weights of the factors to determine an aggregate weighted score for the respective accommodation.

The sorting module 296 is configured to sort (e.g., rank, order, etc.) the basic list of accommodations into a sorted list of accommodations. In one embodiment, the sorted list of accommodations is sorted in descending order based on the aggregate weighted scores of the accommodations. For example, the sorted list of accommodations may have an accommodation with the highest aggregate weighted score ranked first, and an accommodation with the lowest aggregate weighted score ranked last. The sorting module 296 may then send the sorted list of accommodations to the client device 100 (e.g., via the communications interface 220, etc.). The display module 158 of the client device 100 may then provide a display of the sorted list of accommodations on a display (e.g., screen, monitor, etc.) of the user interface 110 in the form of at least one of a list results interface (see, e.g., FIG. 5) and a map results interface (see, e.g., FIG. 6).

Referring now to FIG. 2B, a visual depiction of the processes performed by the various modules of the remote server 200 are shown according to an exemplary embodiment. Table 210 shows a list of several factors, along with the weight given to each of the factors. The factors and respective weights of table 210 may be stored within the weighting module 294. Referring now to table 212, when a user of the accommodation search system 10 runs a search for an accommodation by providing the trip parameters 172, the accommodation module 278 determines the basic list of accommodations that correspond with the trip parameters 172. The client module 280, the colleague module 284, the company module 288, the agency module 290, and/or the trend module 292 then determine one or more factors that apply to each of the accommodations of the basic list of accommodations. The weighting module 294 in turn applies the weights (e.g., from table 210, etc.) for each of the one or more factors to each of the accommodations of the basic list of accommodations. The weighting module 294 may then aggregate the weights for each accommodation of the basic list of accommodations to determine an aggregate weighted score from each accommodation of the basic list of accommodations. The sorting module 296 may then sort (i.e., reorder, etc.) the basic list of accommodations into a sorted list of accommodations (e.g., in descending order, etc.) based on the aggregate weighted score of each accommodation as shown in table 214. The sorted list of accommodations may then be provided to the client device 100 such that the user may see a display of the results of his/her search based on the trip parameters 172, the user preferences 164, the user accommodation history, the schedule 166, the colleague preferences, the colleague accommodation history, the company preferences, the agency preferences, the trend information, and/or other factors. It should be understood that the accommodation search system 10 may include more, less, and/or different factors upon which weights are given and the basic list of accommodations are ranked, as table 210 is an exemplary representation of the factors stored within the weighting module 294.

Referring back to FIG. 2A, in some embodiments, the remote server 200 includes the location module 298. The location module 298 may be configured to facilitate providing information regarding a distance and/or navigation instructions from an accommodation to an indicated point or locations of interest(s) (e.g., a meeting location, an office location, a city center, etc.) to a user of the accommodation search system 10 responsive to an input from the user on the client device 100. In one embodiment, the location module 298 is configured to provide the distance and/or navigation instructions in a list configuration responsive to the display module 158 displaying the sorted list of accommodations to the user of the client device 100 with a list results interface (see, e.g., FIG. 5). In another embodiment, the location module 298 is configured to provide the distance and/or navigation instructions in a map configuration responsive to the display module 158 displaying the sorted list of accommodations to the user of the client device 100 with a map results interface (see, e.g., FIGS. 6-8). In one embodiment, the input from the user of the client device 100 includes a predefined setting to display the distance and/or navigation instructions. In another embodiment, the input from the user of the client device 100 includes selecting a respective accommodation via touching a touchscreen to select the respective accommodation (e.g., on a touchscreen device such as a smartphone, tablet, laptop, etc.) or via a mouse click on the respective accommodation (e.g., with a mouse connected to a laptop, a desktop computer, a tablet, etc.), among other alternatives. The distance and/or navigation instructions may provide the user of the accommodation search system 10 with additional information to aid the user in making a selection of an accommodation that best fits his/her needs. In an alternative embodiment, the location module 298 is stored within the memory 154 of the client device 100 and may include or use various navigation/map software stored on the client device 100 to provide the distance and/or navigation instructions to the user of the accommodation search system 10.

Figure 3:
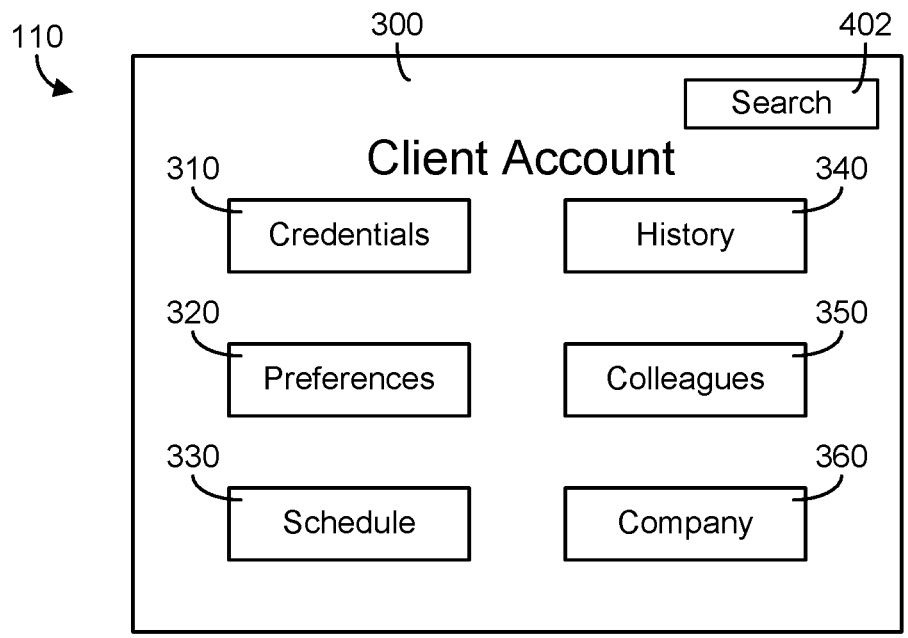
FIG. 3 is an illustration of an account interface, according to an exemplary embodiment.

According to the exemplary embodiments shown in FIGS. 3-8, various user interfaces that may be provided to a user of the accommodation search system 10 on the user interface 110 of the client device 100 are illustrated. As shown in FIG. 3, an account interface, shown as client account interface 300, may be provided to a user of the accommodation search system 10. In one embodiment, the client account interface 300 is provided to a new user of the accommodation search system 10 following creating a new account to enter/link various information to his/her account. In other embodiments, a returning user of the accommodation search system 10 is able to access the client account interface 300 to review and/or update the information previously provided by the user. As shown in FIG. 3, the client account interface 300 includes a plurality of buttons 310-360 configured to allow a user of the client device 100 to select which information to view, enter, delete, and/or update on the client device 100. In one embodiment, all of the information is stored on the remote server 200 and retrieved by the client device 100 when the user requests it (i.e., through the client account interface 300, etc.). In some embodiments, at least a portion of the information is stored on at least one of the client device 100 and the remote server 200.

The credentials button 310 may be configured to provide the user of the accommodation search system 10 with a credential interface. The credential interface may allow the user to view, update, and/or delete his/her user credentials 162 (e.g., username, email, password, etc.). The credentials interface may further allow a user to link his/her account to a social media or business networking profile. The preferences button 320 may be configured to provide the user of the accommodation search system 10 with a preference interface. The preference interface may allow the user to view, update, and/or delete his/her user preferences 164. The schedule button 330 may be configured to provide the user of the accommodation search system 10 with a schedule interface. The schedule interface may allow the user to view, manually add, manually update, and/or manually delete events (e.g., a meeting at location X at time Y on date Z, etc.). The schedule interface may also allow a user to connect/sync the accommodation search system 10 with a planner/itinerary, email account, and/or social media account of the user such that events may automatically be synced from the user's email account, social media account, calendar, or itinerary. The history button 340 may be configured to provide the user with his/her recent accommodations (e.g., last three accommodations, last five accommodations, etc.) and/or allow a user to clear his/her recent accommodations. The colleague button 350 may be configured to provide the user of the accommodation search system 10 with a colleague interface. The colleague interface may allow the user to view, manually update, and/or manually delete colleagues. The colleague interface may also allow a user to connect/sync the accommodation search system 10 with a social media account and/or a business networking account of the user such that colleagues (e.g., friends, connections, etc.) may automatically be synced from the user's profile(s). The company button 360 may be configured to provide the user of the accommodation search system 10 with a company interface. The company interface may allow the user to view, manually enter, manually update, and/or manually delete a company he/she is employed by. The company interface may also allow a user to connect/sync the accommodation search system 10 with a social media account and/or a business networking account of the user such that the company he/she is employed by may automatically be synced from the user's profile(s). The client account interface 300 may also include an accommodation search interface button 402 that is configured to direct the user to the accommodation search interface 400 (see, e.g., FIG. 4).

Figure 4:
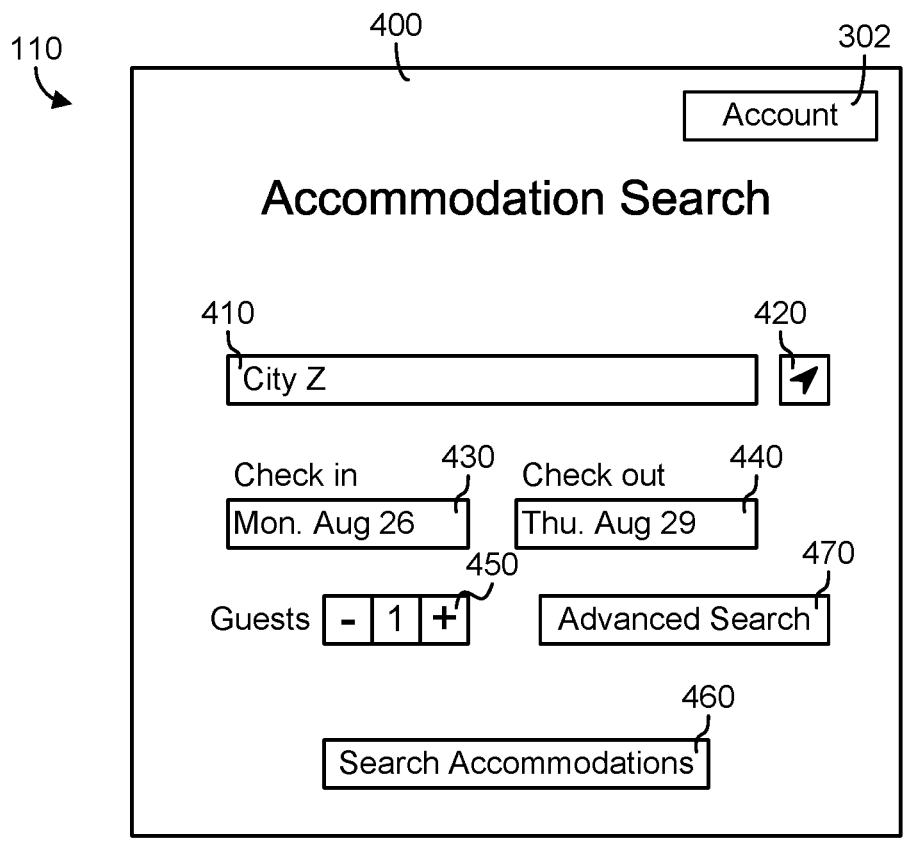
FIG. 4 is an illustration of an accommodation search interface, according to an exemplary embodiment.

As shown in FIG. 4, a search interface, shown as accommodation search interface 400, is configured to allow a user to enter the trip parameters 172 into the accommodation search system 10. By way of example, the user may be able to specify a type of accommodation he/she is interested in performing a search for (e.g., a hotel, a car rental, a plane ticket, etc.). The accommodation search interface 400 may include various buttons and/or fillable slots configured to receive the trip parameters 172. In one embodiment, the user provides the location for the accommodation search via a fillable location slot, shown as location slot 410. The location slot 410 is configured to receive a city, zip code, and the like to narrow the accommodation search to a designated location or region. In an alternative embodiment, the user provides the location for the accommodation search via a current location button, shown as location button 420. The location button 420 may be configured to instruct at least one of the client device 100 and the remote server 200 to provide a current location of the user (e.g., via a global positioning system, geolocation, etc.) to the location slot 410 such that the search is performed based on a predefined distance (e.g., 5 miles, 10 miles, 15 miles, etc.) from the current location of the client device 100 of the accommodation search system 10. The predefined distance may be chosen by the user or preset within the memory of the accommodation search system 10.

Referring still to FIG. 4, a user may narrow the accommodation search by providing check in information (e.g., a date desired for check-in, etc.) to a fillable check in slot, shown as check in slot 430. A user may also provide check out information (e.g., a date desired for check-out, etc.) to a fillable check out slot, shown as check out slot 440. A user may further narrow the accommodation search by providing a number of guests that may be using the accommodation (e.g., staying in a hotel room, etc.) under the potential accommodation reservation via a guest button 450. A user may choose to further narrow the accommodation search by selecting an advanced search button 470. The advanced search button 470 may direct the user to an advanced accommodation search interface. The advanced search interface may be configured to allow a user to further narrow his/her search than available with the accommodation search interface 400. For example, via the advanced search interface, a user may enter more detailed information such as accommodation names, accommodation chains/groups, a desired number of rooms (e.g., in a hotel embodiment, etc.), a price range preference, a rating preference, and the like. The accommodation search system 10 may ask the user whether he/she would like to save the advanced filters as part of his/her user preferences 164 which then may be used for future accommodation searches. Once a user has entered his/her desired trip parameters 172 within the accommodation search interface 400, the user may choose to conduct a search for accommodations that correspond with the trip parameters 172 provided. The user may prompt the accommodation search system 10 to conduct such a search by selecting a search accommodations button 460. The accommodation search interface 400 may also include a client account interface button 302 that is configured to direct the user to the client account interface 300 of FIG. 3.

Figure 5:
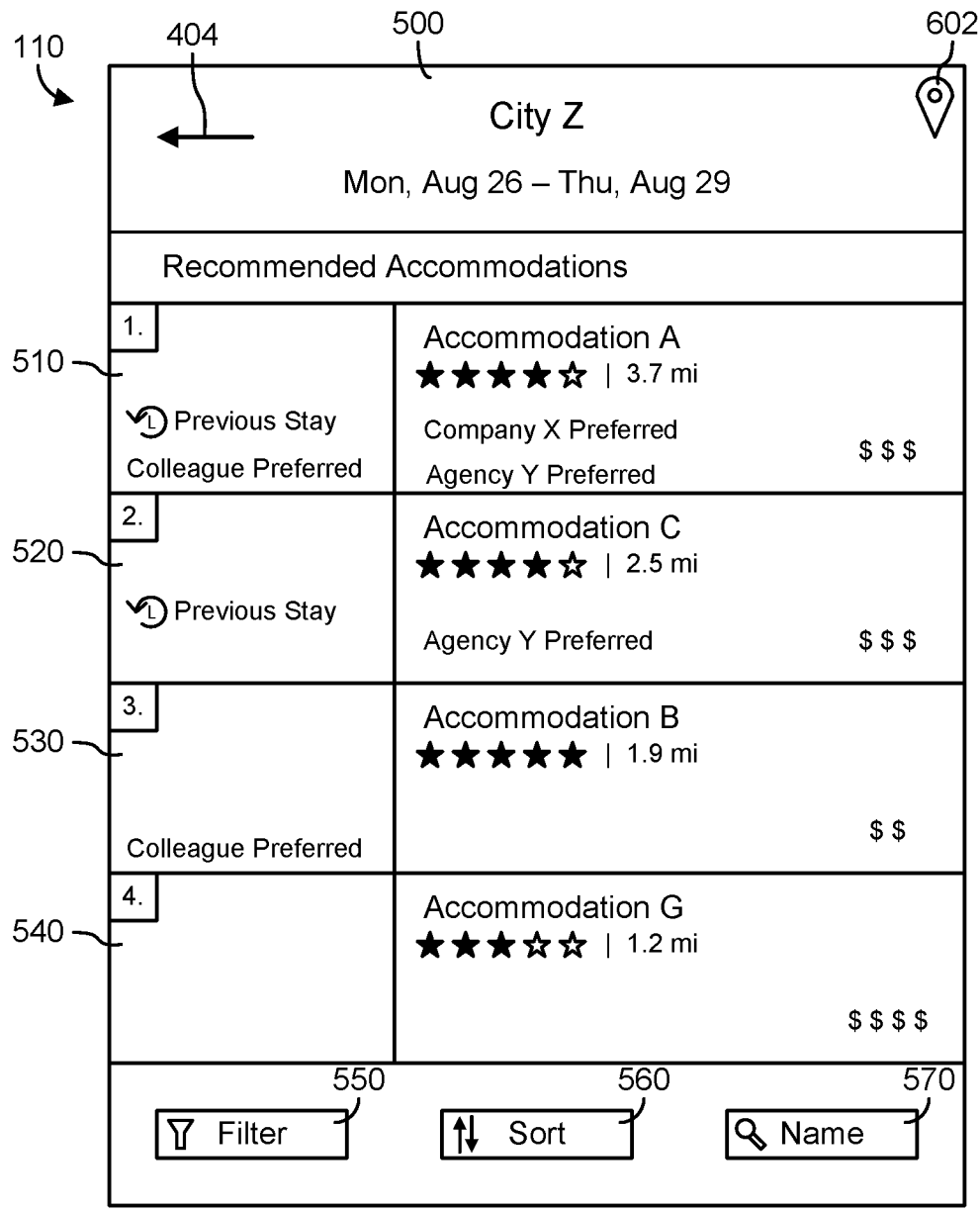
FIG. 5 is an illustration of a list interface displaying accommodation search results in a list configuration, according to an exemplary embodiment.

Referring now to FIGS. 2B and 5, the display of the user interface 110 may display a results interface, shown as accommodation list results interface 500, following the remote server 200 conducting the accommodation search and applying the weighted scoring system to the basic list of accommodations, as shown in FIG. 2B. The accommodation list results interface 500 is configured to provide the sorted list of accommodations (i.e., the table 214, etc.) to the user in a list configuration based on the trip parameters 172 provided via the accommodation search interface 400 and the one or more factors determined from the information (e.g., user credentials 162, user preferences 164, schedule 166, company information 168, colleague information 170, etc.) provided via the client account interface 300. As shown in FIGS. 2B and 5, the sorted list of accommodations 510-540 are presented to a user of the accommodation search system 10 in a manner that correlates with the table 214. According to an exemplary embodiment, the first ranked accommodation 510 (e.g., Accommodation A, etc.) satisfies eight of nine predefined factors stored in the Table 210 (e.g., as shown in table 212, etc.). For example, the user may have user preferences 164 such as an accommodation or accommodation chain/group that Accommodation A is affiliated with (e.g., factor 1, etc.), a three dollar sign maximum price (e.g., factor 8, etc.), and a minimum rating of four stars (e.g., factor 9, etc.). The history stored within the remote server 200 may also indicate that the user and at least one of the user's colleagues have previously stayed at Accommodation A (e.g., factor 3, factor 7, etc.). Further, the company X that employs the user, a colleague of the user, and the agency Y (e.g., that owns, operates, and/or is affiliated with the accommodation search system, etc.) may indicate that they prefer an accommodation or accommodation chain/group that Accommodation A is affiliated with (e.g., factor 2, factor 6, factor 8, etc.).

In some embodiments, the accommodation search system 10 is configured to provide a user with distance information on the accommodation list results interface 500. The distance information may indicate a distance from the user's current location to the accommodation or a distance from the accommodation to a location of interest indicated by the user (e.g., via the schedule 166, etc.). According to an exemplary embodiment, the accommodation list results interface 500 allows a user to scroll up and down, or provides a button allow a user to load more results or go to a subsequent page of sorted accommodation results. The user may also use the filter button 550, the sort button 560, and/or the name/search button 570 to further narrow or reorder the sorted list of accommodations provided by the accommodation list results interface 500 (e.g., based on distance, price, rating, etc.). According to an exemplary embodiment, a user is able to select an accommodation provided by the accommodation list results interface 500. By selecting an accommodation, the user may be provided a more detailed description (e.g., location, directions, amenities, features, policies, etc.) of the selected accommodation. The user may also be able to reserve the accommodation after selecting to see a more detailed view of the accommodation.

As shown in FIG. 5, the user may select a return button 404 configured to return the user to the accommodation search interface 400 to change/update the trip parameters 172. The user may also select a map button 602 configured to direct the user to an accommodation map results interface (see, e.g., FIG. 6, etc.).

Figure 6:
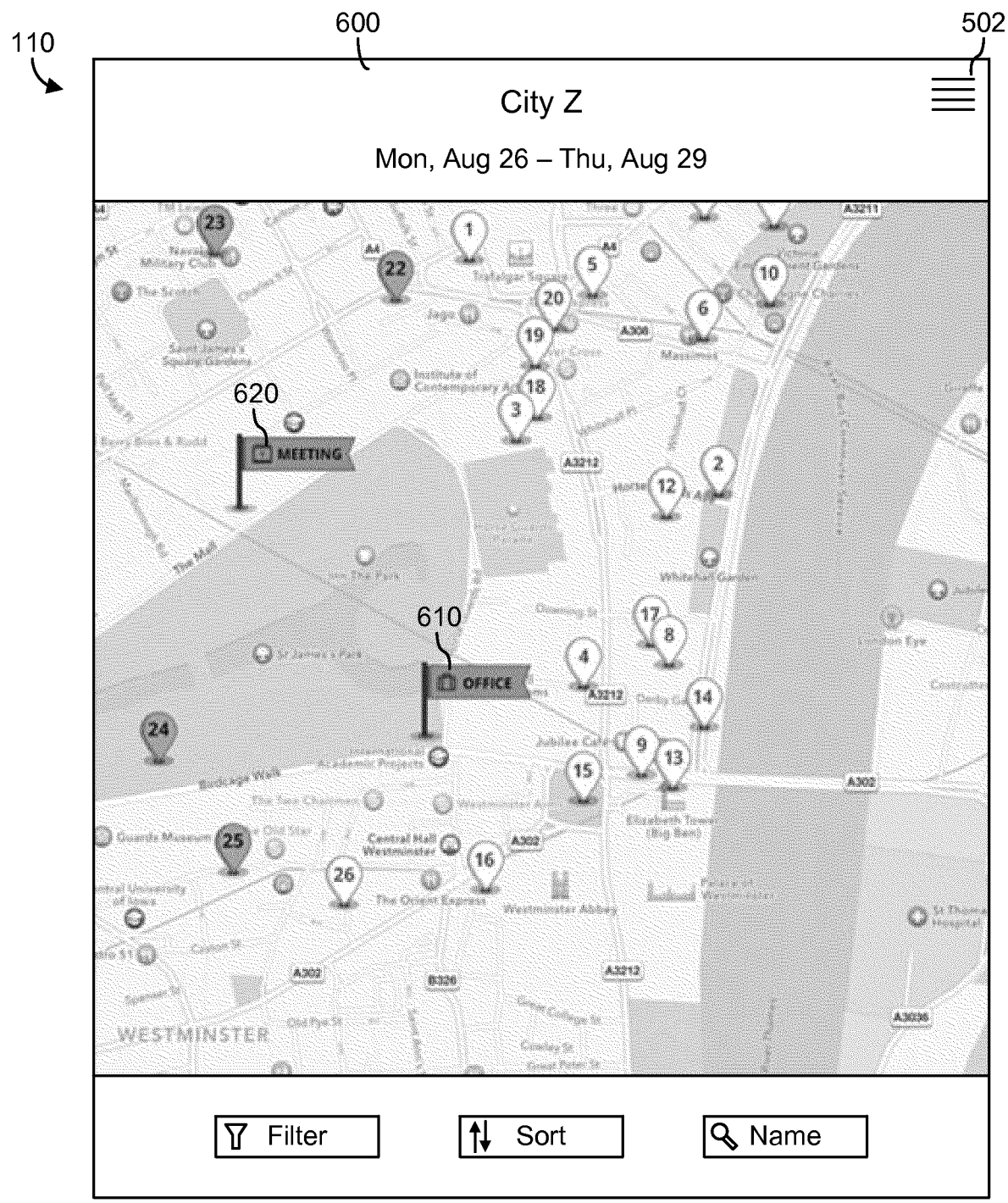
FIG. 6 is an illustration of map interface displaying accommodation search results in a map configuration, according to an exemplary embodiment.

Referring now to FIGS. 2B and 6, the display of the user interface 110 may display a results interface, shown as accommodation map results interface 600, following the remote server 200 conducting the accommodation search and applying the weighted scoring system to the basic list of accommodations, or the user selecting the map button 602 from the accommodation list results interface 500. The accommodation map results interface 600 is configured to provide the sorted list of accommodations (i.e., the table 214, etc.) to the user in a map configuration based on the trip parameters 172 provided via the accommodation search interface 400 and the one or more factors determined from the information (e.g., user credentials 162, user preferences 164, schedule 166, company information 168, colleague information 170, etc.) provided via the client account interface 300. As shown in FIGS. 2B and 6, the sorted list of accommodations are presented to a user of the accommodation search system 10 in a visual manner (e.g., via a map, etc.) that correlates with the table 214. In an alternative embodiment, aspects of the accommodation list results interface 500 and the accommodation map results interface 600 are combined into a single interface.

As shown in FIG. 6, the accommodation map results interface 600 may provide a visual representation of locations of interest, shown as first location of interest 610 (e.g., an office location, etc.) and second location of interest 620 (e.g., a meeting location, etc.), in relation to the location of each accommodation provided from the accommodation search performed by the remote server 200. The first location of interest 610 and the second location of interest 620 may be imported/synced to the remote server 200 based on the schedule 166 (e.g., a location of a scheduled meeting, etc.) or entered directly by the user via the accommodation map results interface 600. In some embodiments, the accommodation map results interface 600 may include more or less than two locations of interest. The locations of interest may include a variety of types of locations including, but are not limited to, a city center, a meeting, an office, an attraction (e.g., a sporting event, a museum, a restaurant, a monument, an amusement park, etc.), and/or any other location designated by the user or the schedule 166 of the user. According to an exemplary embodiment, the accommodation map results interface 600 is configured to display accommodations that are located within a certain radius of each of the locations of interest (e.g., accommodations outside of the radius of one or more locations of interest are not displayed, etc.). The accommodation map results interface 600 may be configured to allow a user to select one of the provided accommodations such that the user is provided with a more detailed description (e.g., location, directions, amenities, features, policies, etc.) of the selected accommodation. The user may also be able to reserve the accommodation after selecting to see a more detailed view of the accommodation. The user may also select a list button 502 configured to direct the user to the accommodation list results interface 500. Again, the user may use the filter button, the sort button, and/or the name/search button to further narrow or reorder the sorted list of accommodations provided by the accommodation map results interface 600.

Figure 7:
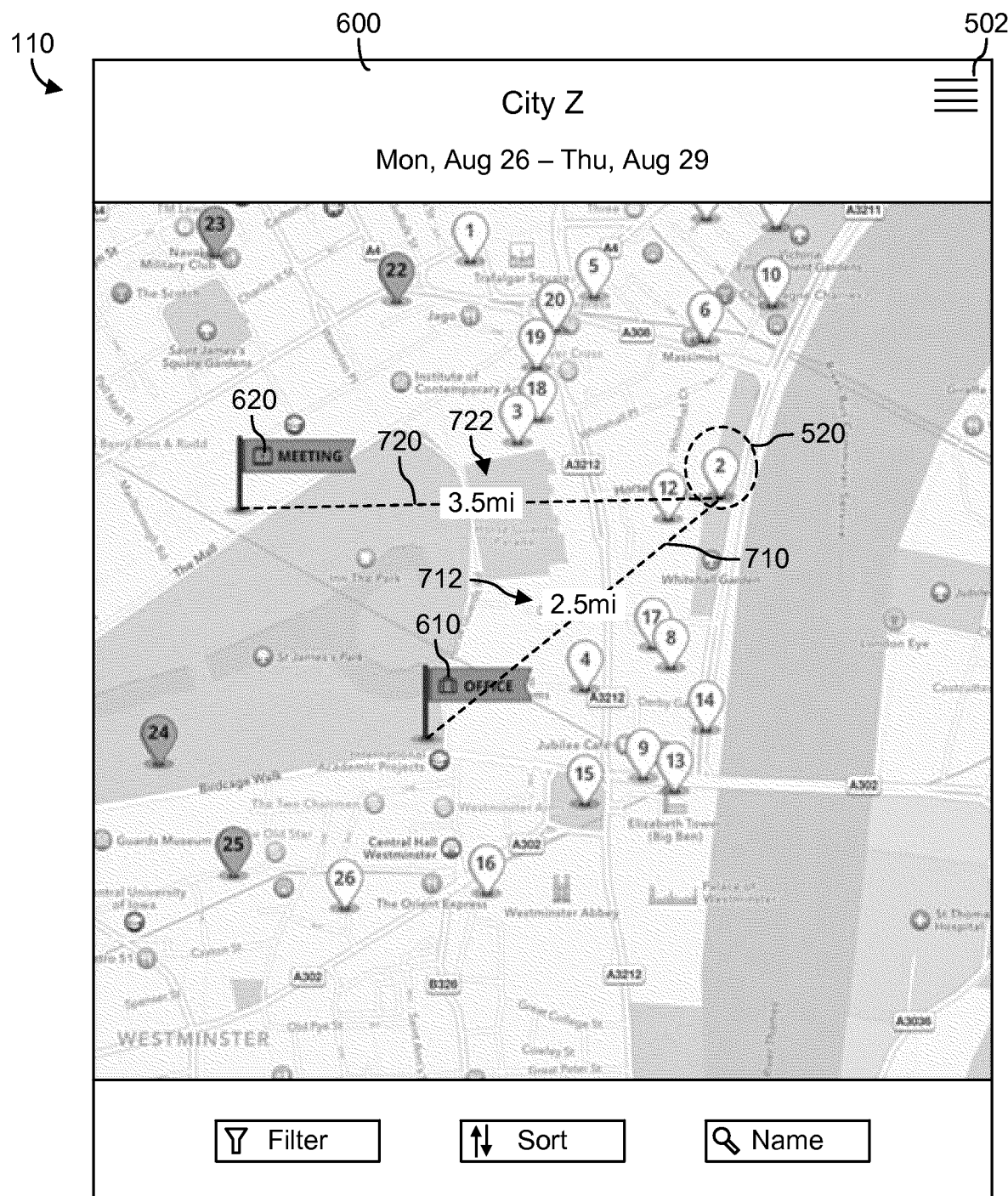
FIG. 7 is an illustration of a distance between an accommodation and locations of interest, according to an exemplary embodiment.
Figure 8:
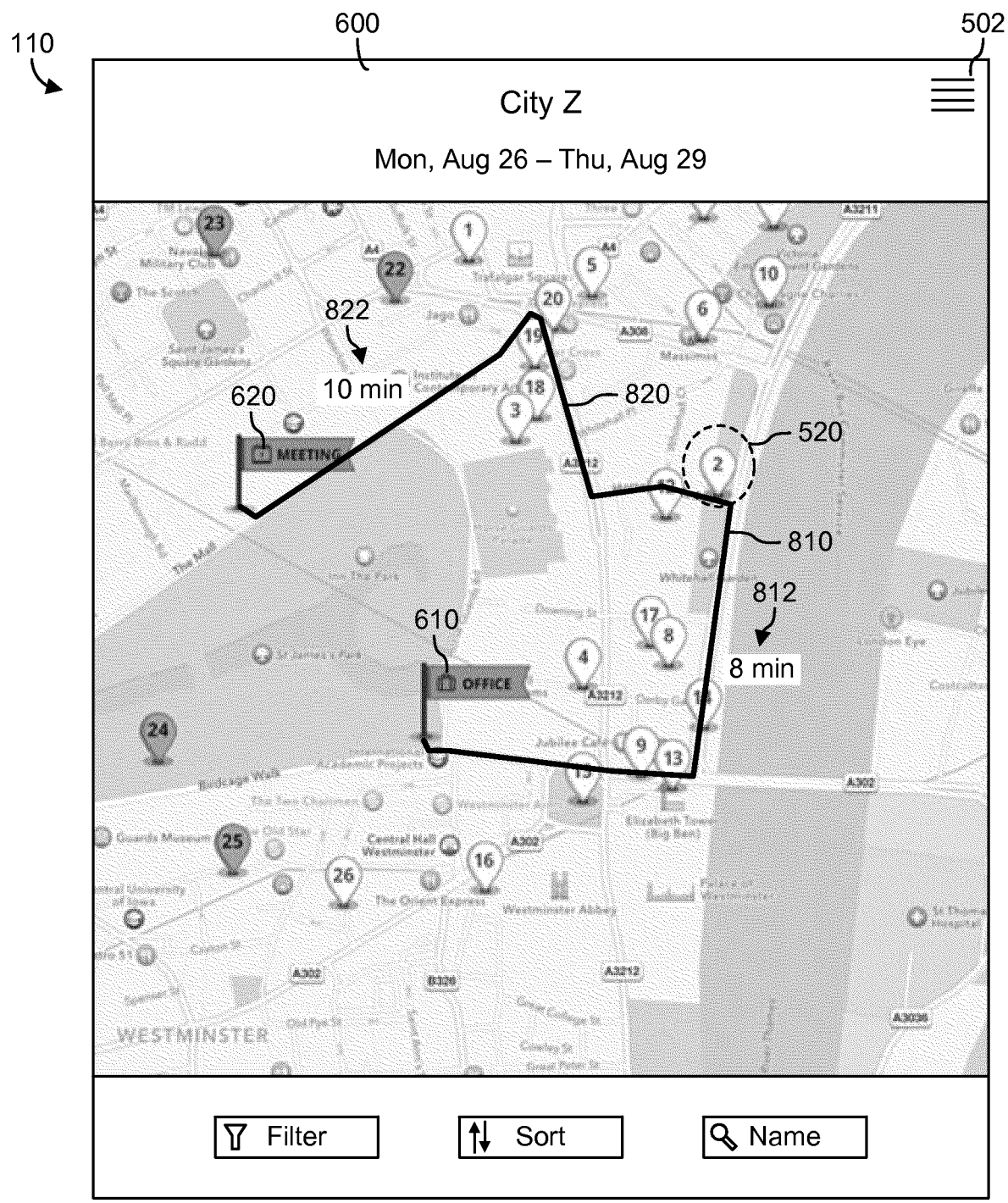
FIG. 8 is an illustration of travel routes between an accommodation and locations of interest, according to an exemplary embodiment.

According to the exemplary embodiment shown in FIGS. 7-8, a user may indicate an accommodation for which he/she wishes to receive distance and/or navigation instructions about through the accommodation map results interface 600. The user may indicate which accommodation he/she is interested in by holding his/her finger over the desired accommodation (e.g., in an embodiment where the client device 100 is structured as a touch screen device, etc.) and/or by hovering a mouse cursor over the desired accommodation (e.g., in an embodiment where the client device 100 is structured as a computer or laptop, etc.) as indicated by the dotted circle around the second ranked accommodation 520 (e.g., Accommodation C, etc.). According to the exemplary embodiment shown in FIG. 7, the user is provided one or more paths, shown as path 710 and path 720, on the accommodation map results interface 600 that extend from the selected accommodation (e.g., the second ranked accommodation 520, etc.) to the one or more locations of interest, the first location of interest 610 and the second location of interest 620, respectively. The number of paths may correspond with the number of locations of interest indicated by the user and/or the schedule 166. For example, if one location of interest is present, one path may be generated; if five locations of interest are present, up to five paths may be generated; and so on. A user may be able to hide at least one of the generated paths displayed on the accommodation map results interface 600 if desired.

As shown in FIG. 7, the path 710 and/or the path 720 may display information, shown as path information 712 and path information 722, to the user. The path information 712 and/or the path information 722 may provide a distance between the selected accommodation (e.g., the second ranked accommodation 520, etc.) and the location(s) of interest(s) (e.g., the first location of interest 610, the second location of interest 620, etc.). The user may toggle between various path information such as a distance in metric units (e.g., meters, kilometers, etc.), a distance in English units (e.g., feet, yards, miles, blocks, etc.), and the like.

According to the exemplary embodiment shown in FIG. 8, the user is provided one or more navigation instructions (e.g., a route of travel, etc.), shown as route 810 and route 820, on the accommodation map results interface 600. The route 810 and the route 820 may provide the user with navigation instructions from the selected accommodation (e.g., the second ranked accommodation 520, etc.) to the one or more locations of interest, the first location of interest 610 and the second location of interest 620, respectively. The number of routes of travel may correspond with the number of locations of interest indicated by the user and/or the schedule 166. For example, if one location of interest is present, one route of travel may be generated; if five locations of interest are present, up to five routes of travel may be generated; and so on. A user may be able to hide at least one of the generated routes displayed on the accommodation map results interface 600 if desired.

As shown in FIG. 8, the routes of travel (e.g., the route 810, the route 820, etc.) may display information, shown as route information 812 and route information 822, to the user. The route information 812 and/or the route information 822 may provide an estimated time of travel or distance between the selected accommodation (e.g., the second ranked accommodation 520, etc.) and the location(s) of interest(s) (e.g., the first location of interest 610, the second location of interest 620, etc.). The user may toggle between various displayed information such as a time of travel (e.g., in hours, in minutes, etc.), a distance in metric units (e.g., meters, kilometers, etc.), and a distance in English units (e.g., feet, yards, miles, blocks, etc.). The user may also be able to indicate a mode of transportation such that the navigation instructions correspond with the indicated mode of transportation. For example, the user may be able to indicate modes of transportation such as walking, biking, driving (e.g., a car, a truck, etc.), public transportation (e.g., bus, train, subway, tube, tram, etc.), or another form of transportation. The accommodation map results interface 600 may remove, update, or otherwise alter the route(s) of travel based on selected mode of transportation.

According to an exemplary embodiment, a user receives a list view of the navigation instructions corresponding to one of the routes of travel (e.g., the route 810, the route 820, etc.) provided to the user (e.g., responsive to the user selecting one of the routes, etc.). According to another exemplary embodiment, a user is provided with an interactive, step-by-step navigation from the selected accommodation (or current location) to one of the locations of interest (e.g., responsive to the user selecting one of the routes, etc.). The navigation may provide visual instructions, audible instructions, and/or track the user's progress along the selected route of travel (e.g., distance left, estimated time of arrival, etc.).

Figure 9:
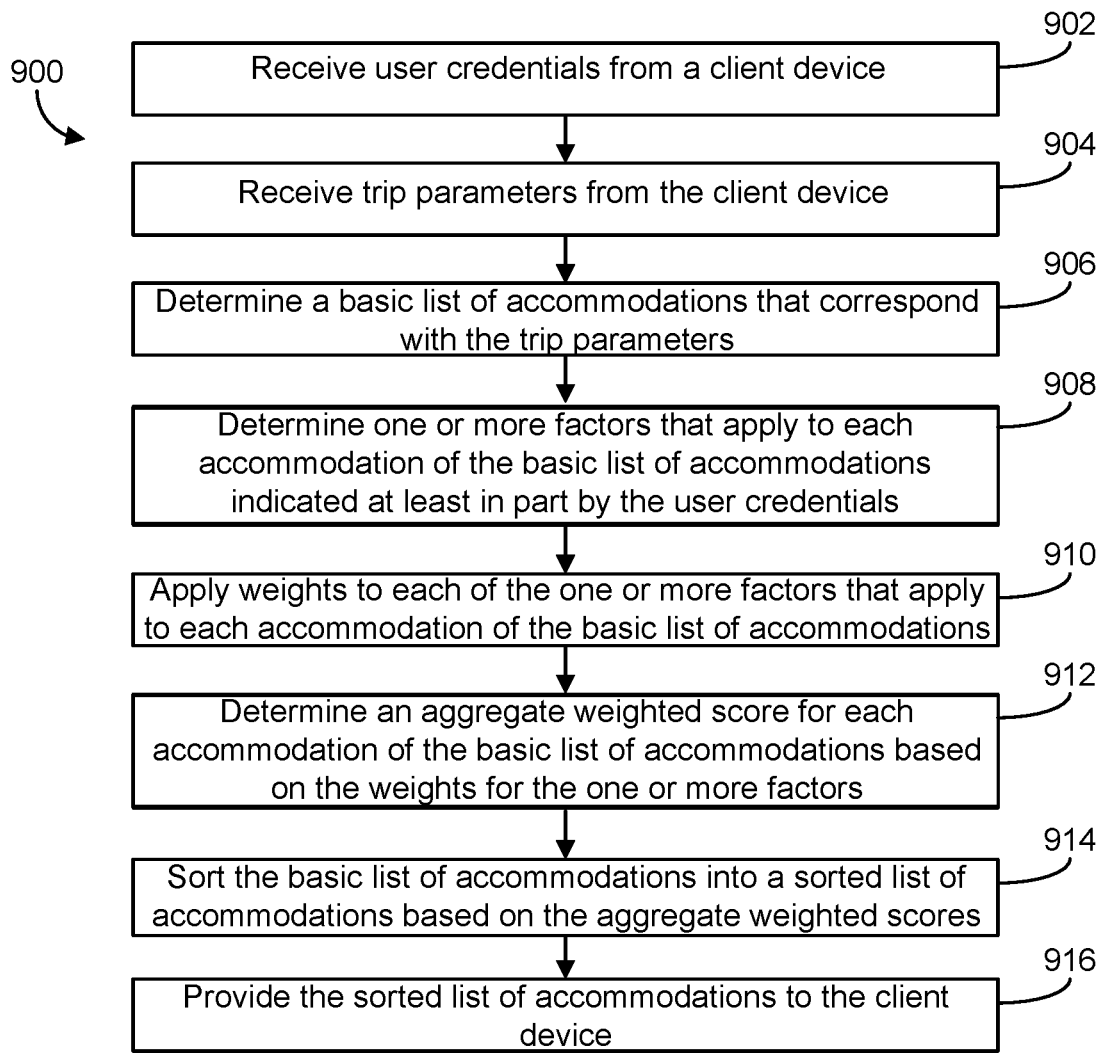
FIG. 9 is a flow diagram of a method for assisting the selection of an accommodation, according to an exemplary embodiment.

Referring now to FIG. 9, a method 900 for assisting the selection of an accommodation is shown according to an exemplary embodiment. In one example embodiment, method 900 may be implemented with the client device 100 and the remote server 200 of the accommodation search system 10 of FIGS. 1-2. Accordingly, method 900 may be described in regard to FIGS. 1-2.

At step 902, a remote server (e.g., the remote server 200, etc.) receives user credentials (e.g., the user credentials 162, etc.) from a client device (e.g., the client device 100, etc.).

The user credentials may include a username, an email address, a password, a social media account, and/or a business networking account, among other possibilities. At step 904, the remote server receives trip parameters (e.g., the trip parameters 172, etc.) from the client device. The trip parameters may include a location/destination for the trip, a date range for the trip, a number of guests, a number of rooms needed, a time of departure, a time of arrival, and the like. At step 906, the remote server determines a basic list of accommodations that correspond with (i.e., satisfy, etc.) the trip parameters.

At step 908, the remote server determines one or more factors that may apply to each accommodation of the basic list of accommodations. In one embodiment, the one or more factors are indicated at least in part by the user credentials. In some embodiments, the one or more factors are be based on at least one of user preferences (e.g., price, rating, accommodation group/chain, etc.), company preferences (e.g., accommodation group/chain, price, rating, etc.), colleague preferences (e.g., accommodation group/chain, price, rating, etc.), user history (e.g., previous use by the user, etc.), and colleague history (e.g., previous use by a colleague of the user, etc.) indicated by the user credentials (i.e., stored within the memory of the remote server and/or client device and linked to the user credentials, etc.). In additional embodiments, the one or more factors are based further on at least one of agency preferences, trend information (e.g., current and/or future trends, etc.), and location information.

At step 910, the remote server applies weights to each of the one or more factors that apply to each accommodation of the basic list of accommodations. For example, an accommodation that is user preferred and company preferred may receive a first weight for the user preferred factor (e.g., a value of 18, etc.) and a second weight for the company preferred factor (e.g., a value of 8, etc.). This may be repeated for each accommodation in the basic list of accommodations. At 912, the remote server determines an aggregate weighted score for each accommodation of the basic list of accommodations based on the weights of the one or more factors applied to each accommodation. To continue the above example, the first weight of the user preferred factor and the second weight of the company preferred factor are aggregated to determine the aggregate weighted score of the accommodation (e.g., 18 and 8 results in an aggregate weighted score of 26, etc.).

At step 914, the remote server sorts the basic list of accommodations into a sorted list of accommodations based on the aggregate weighted score of each of the accommodations. In one embodiment, the sorted list of accommodations is arranged is a descending order. For example, the accommodation with the highest aggregate weighted score is ranked first and the accommodation with the lowest aggregate weighted score is ranked last. At step 916, the remote server provides (e.g., transmits, sends, etc.) the sorted list of accommodations to the client device. In one embodiment, the client device displays the sorted list of accommodations to a user in a list configuration (e.g., the accommodation list results interface 500, etc.). In another embodiment, the client device displays the sorted list of accommodations to a user in a map configuration (e.g., the accommodation map results interface 600, etc.).

Figure 10:
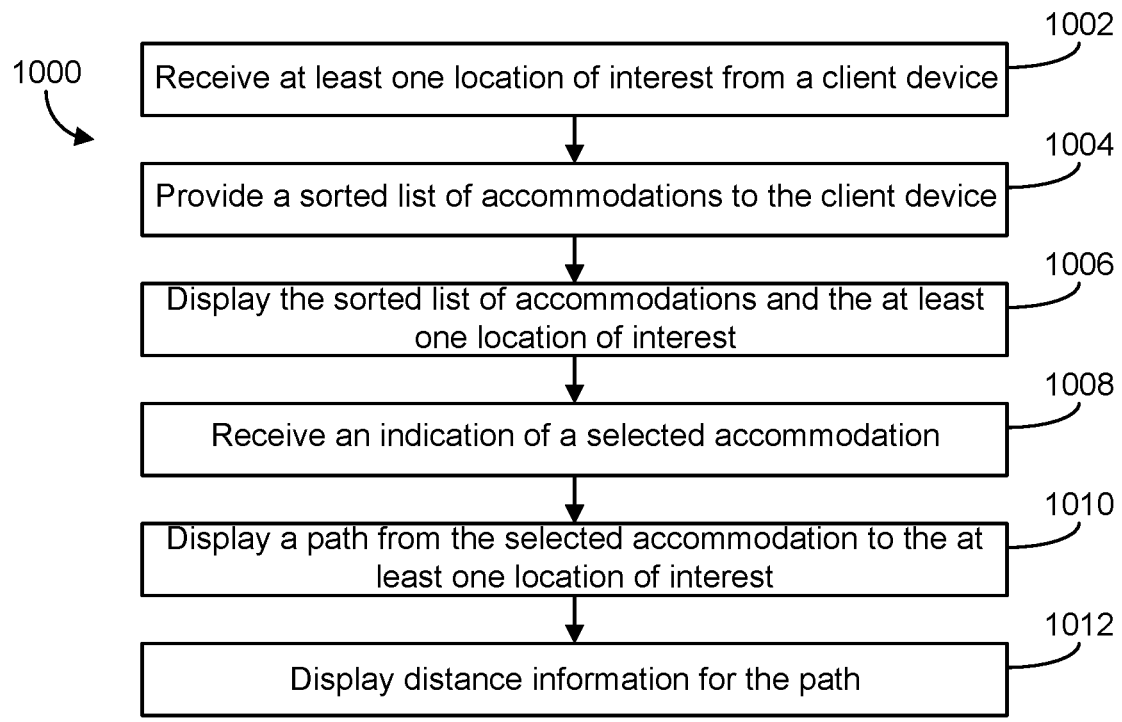
FIG. 10 is a flow diagram of a method for accommodation evaluation using locations of interest, according to an exemplary embodiment.

Referring now to FIG. 10, a method 1000 for accommodation evaluation using locations of interest is shown according to an exemplary embodiment. In one example embodiment, method 1000 may be implemented with the client device 100 and the remote server 200 of the accommodation search system 10 of FIGS. 1-2. Accordingly, method 1000 may be described in regard to FIGS. 1-2.

At step 1002, a remote server (e.g., the remote server 200, etc.) receives at least one location of interest from a client device (e.g., the client device 100, etc.). In one embodiment, the at least one location of interest is manually entered by a user on the client device and sent to the remote server. In another embodiment, the at least one location of interest is imported/synced to the remote server from a calendar, schedule, email account, social media account, and/or itinerary of the user (e.g., the schedule 166, stored on the client device, etc.). By way of example, the location of interest may include a variety of locations such as a city center, a meeting, an office, an attraction (e.g., a sporting event, a museum, a restaurant, a monument, an amusement park, etc.), and/or any other location designated by the user or the schedule of the user.

At step 1004, the remote server provides a sorted list of accommodations to the client device (see steps 902-912 of method 900). In one embodiment, the sorted list of accommodations is based at least in part on the at least one location of interest. For example, the sorted list of accommodations determined in method 900 is further sorted based on the location of the accommodations relative to the at least one location of interest. At step 1006, the client device displays the sorted list of accommodations and the at least one location of interest in a map configuration (e.g., the accommodation map results interface 600, etc.).

At step 1008, the client device receives an indication of a selected accommodation. The indication may be provided by an input from the user of the client device such as selecting an accommodation by touching a touchscreen where the accommodation is displayed, by a mouse click on the accommodation, or by hovering over the accommodation with a mouse cursor. At step 1010, the client device displays a path (e.g., a straight line path, etc.) from the selected accommodation to the at least one location of interest. At step 1012, client device displays distance information for the path from the selected accommodation to the at least one location of interest. The distance information may indicate a distance between the selected accommodation and the at least one location of interest. In some embodiments, the client device transmits the indication of the selected accommodation to the remote server. The remote server may then provide a command to the client device to display the path(s) and/or the distance information.

Figure 11:
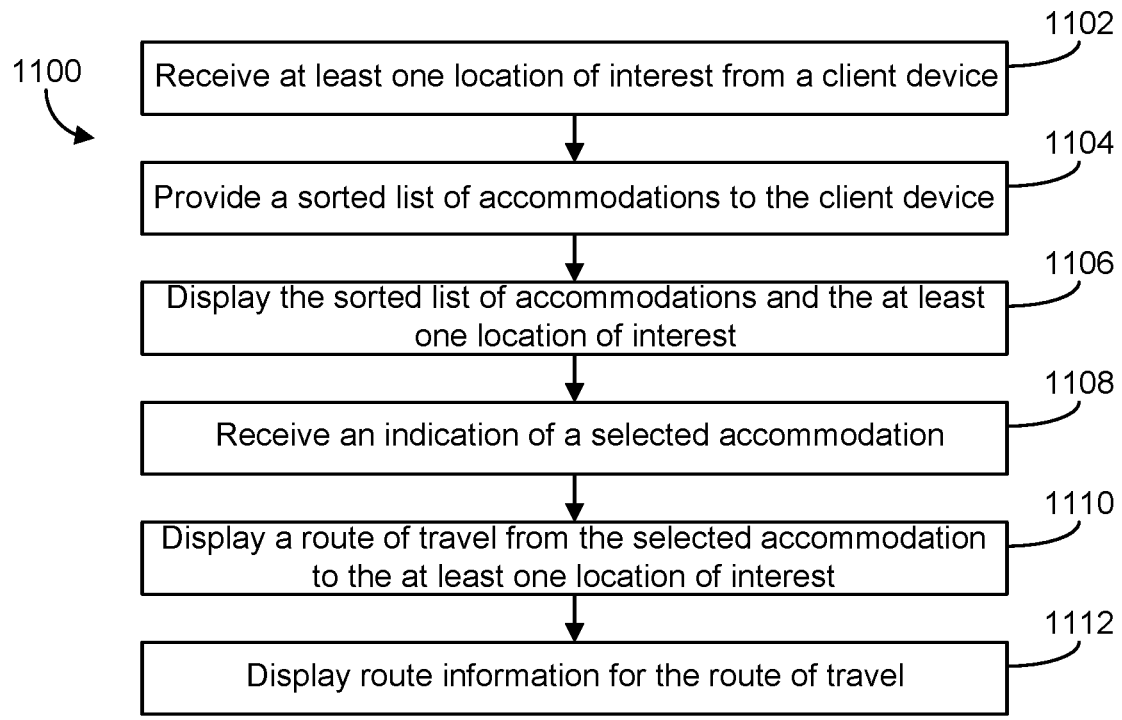
FIG. 11 is a flow diagram of a method for accommodation evaluation using locations of interest, according to another exemplary embodiment.

Referring now to FIG. 11, a method 1100 for accommodation evaluation using locations of interest is shown according to another exemplary embodiment. In one example embodiment, method 1100 may be implemented with the client device 100 and the remote server 200 of the accommodation search system 10 of FIGS. 1-2. Accordingly, method 1100 may be described in regard to FIGS. 1-2.

At step 1102, a remote server (e.g., the remote server 200, etc.) receives at least one point/location of interest from a client device (e.g., the client device 100, etc.). In one embodiment, the at least one location of interest is manually entered by a user on the client device and sent to the remote server. In another embodiment, the location of interest is imported/synced to the remote server from a calendar, schedule, social media account, and/or itinerary of the user (e.g., the schedule 166, etc.). By way of example, the location of interest may include a variety of locations such as a city center, a meeting, an office, an attraction (e.g., a sporting event, a museum, a restaurant, a monument, an amusement park, etc.), and/or any other location designated by the user or the schedule of the user.

At step 1104, the remote server provides a sorted list of accommodations to the client device (see steps 902-912 of method 900). In one embodiment, the sorted list of accommodations is based at least in part on the at least one location of interest. For example, the sorted list of accommodations determined in method 900 is further sorted based on the location of the accommodations relative to the at least one location of interest. At step 1106, the client device displays the sorted list of accommodations and the at least one location of interest in a map configuration (e.g., the accommodation map results interface 600, etc.).

At step 1108, the client device receives an indication of a selected accommodation. The indication may be provided by an input from the user of the client device such as selecting an accommodation by touching a touchscreen where the accommodation is displayed, or by a mouse click on the accommodation or hovering over the accommodation with a mouse cursor. At step 1110, the client device displays a route of travel (e.g., directions, navigation instructions, etc.) from the selected accommodation to the at least one location of interest. The route of travel may be along a road (e.g., for a bus, a personal vehicle, a taxi, etc.), a sidewalk (e.g., for walking, biking, etc.), a pathway (e.g., through a park, etc.), and/or a railway (e.g., for a train, a tram, a trolley, etc.). At step 1112, client device displays route information for the route of travel from the selected accommodation to the at least one location of interest. The route information may indicate an estimated time of travel and/or a distance along the route of travel from the selected accommodation to the at least one location of interest.

In some embodiments, the client device transmits the indication of the selected accommodation to the remote server. The remote server may then provide a command to the client device to display the route(s) and/or the route information. In another embodiment, the user is able to indicate a mode of transportation such that the navigation instructions for the route correspond with the indicated mode of transportation. The client device and/or remote server may remove, update, or otherwise alter the route(s) based on indicated mode of transportation.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method for assisting selection of an accommodation by an accommodation search system comprising:
   a) at a server computer, receiving user credentials for a user from a user device;
   b) at the server computer, connecting to a calendar associated with the user;
   c) at the server computer, receiving search parameters from the user device;
   d) at the server computer, identifying a first location of interest in the calendar for the search parameters;
   e) at the server computer, using the search parameters to obtain from the accommodation search system a results list having a plurality of accommodations;
   f) at the server computer, comparing an accommodation location for each accommodation in the results list against the first location of interest to determine a determined distance;
   g) at the server computer, identifying a set of selected accommodations from the results list wherein the determined distance for each accommodation in the set of selected accommodations is less than a set distance; and
   h) at the server computer, returning the set of selected accommodations to the user device.

2. The method of claim 1, wherein a client schedule module on the server computer interprets a schedule of the user found on the calendar to identify the first location of interest.

3. The method of claim 1, wherein the set of selected accommodations are returned to the user device through a user interface that provides a map showing the set of selected accommodations and the first location of interest, wherein the set of selected accommodations comprises a first selected accommodation and a second selected accommodation.

4. The method of claim 3, wherein the map provides a distance determination between the first selected accommodation and the first location of interest.

5. The method of claim 4, wherein the distance determination is provided after the user selects the first selected accommodation using the user interface.

6. The method of claim 3, wherein the map provides navigation instructions from the first selected accommodation and the first location of interest.

7. The method of claim 6, wherein the navigation instructions are provided after the user selects the first selected accommodation using the user interface.

8. The method of claim 1, wherein a second location of interest is identified in the calendar for the search parameters, and further wherein the set of selected accommodations also has a distance from the second location of interest that is less than the set distance.

9. The method of claim 8, wherein the set of selected accommodations are returned to the user device through a user interface that provides a map showing the set of selected accommodations, the first location of interest, and the second location of interest.

10. The method of claim 9 wherein the map provides a distance information showing distances between a first selected accommodation and the first location of interest and between the first selected accommodation and the second location of interest.

11. The method of claim 1, wherein the server computer provides a schedule interface to the user device allowing the user to connect their calendar to the server computer.

12. The method of claim 11, wherein the calendar is maintained in a source selected from a set consisting of an email account and a social media account.

13. The method of claim 2, wherein the first location of interest is selected from a set comprising a meeting location, an office, an attraction, a museum, and a restaurant.

14. A server comprising:
a) a processor;
b) a communications interface to communicate over a network with a user device; and
c) memory containing programming for the processor, wherein the programming instructs the processor to:
  i) receive user credentials for a user from the user device,
  ii) connect to a calendar associated with the user,
  iii) receive search parameters from the user device,
  iv) identify a first location of interest in the calendar for the search parameters,
  v) use the search parameters to obtain from an accommodation database a results list having a plurality of accommodations,
  vi) compare an accommodation location for each accommodation in the results list against the first location of interest to determine a determined distance,
  vii) identify a set of selected accommodations from the results list wherein the determined distance for each accommodation in the set of selected accommodations is less than a set distance, and
  viii) return the set of selected accommodations to the user device.

15. The server of claim 14, wherein the programming comprises a client schedule module that instructs the processor to interpret a schedule of the user found on the calendar to identify the first location of interest.

16. The server of claim 14, wherein the set of selected accommodations are returned to the user device through a user interface that provides a map showing the set of selected accommodations and the first location of interest, wherein the set of selected accommodations comprises a first selected accommodation and a second selected accommodation.

17. The server of claim 16, wherein the map provides a distance determination between the first selected accommodation and the first location of interest.

18. The server of claim 16, wherein the map provides navigation instructions from the first selected accommodation and the first location of interest.

19. The server of claim 14, wherein the programming instructs the processor to provide a schedule interface to the user device allowing the user to sync their calendar, wherein the calendar is maintained in a source selected from a set consisting of an email account and a social media account.

20. The server of claim 14, wherein the first location of interest is selected from a set comprising a meeting location, an office, an attraction, a museum, and a restaurant.

* * * * *